Jan. 3, 1928.
L. E. TROYER
CULTIVATOR BLADE
Filed July 9, 1925
1,654,765
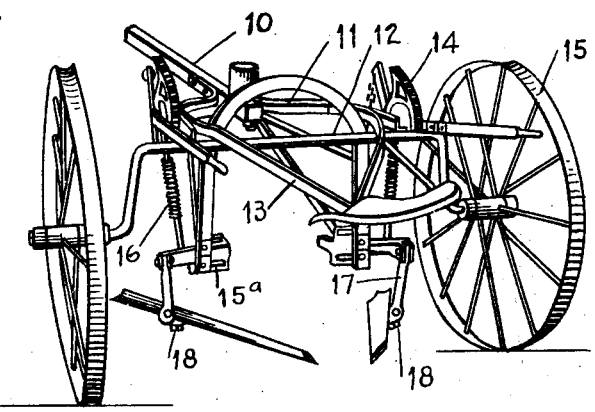
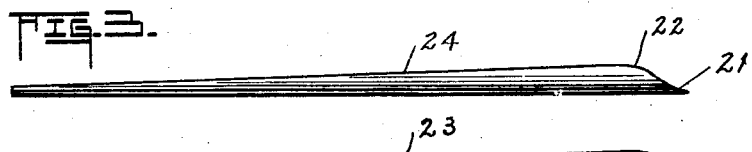
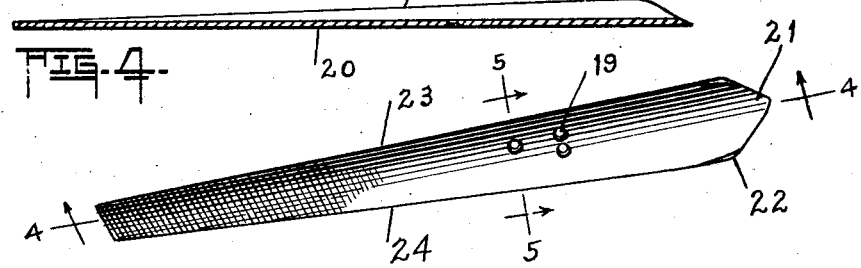
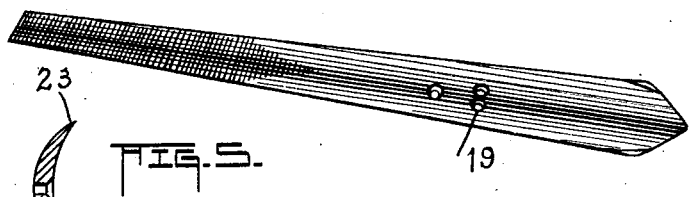
INVENTOR
Lloyd E. Troyer
BY
ATTYS Patented Jan. 3, 1928.

1,654,765

UNITED STATES PATENT OFFICE.

LLOYD E. TROYER, OF HUDSON, ILLINOIS.

CULTIVATOR BLADE.

Application filed July 9, 1925. Serial No. 42,342.

My invention relates to cultivators, and more particularly to the blade portions thereof that are adapted to be mounted thereon.

The object of the invention is in the provision of a cultivator blade fashioned in a manner that it becomes automatically cleansed during use.

Another object of the invention is in the provision of a specially fashioned cultivator blade capable of even greater utility than the formal two bladed portions normally used upon cultivators of the surface type.

Still another object of the invention is in the provision of a cultivator blade adapted for complete adjustment as regards depth of cut, as well as to permit sharpening of both edges thereof at one time, and hence capable of interchangeability with the opposed blade.

Yet another object of the invention is in the provision of a cultivator blade capable of automatically cleansing itself during operation, due to the concave fashioning of the forward end of the blade and the flatted rear portion thereof.

A still further object of the invention is in the provision of a cultivator blade capable of automatically cleansing itself while in use, as well as the feature of interchangeability with an opposed blade to permit continuous use, without sharpening.

Other objects of my invention will appear in the following specification, taken in connection with the annexed drawings, in which Fig. 1 shows a perspective of a cultivator of the so-called surface type;

Fig. 2 discloses perspective views of the cultivator blades themselves;

Fig. 3 is a side elevation of the cultivator blade;

Fig. 4 is a sectional view taken on the line 4—4 of Fig. 2; and

Fig. 5 is a cross sectional view taken on the line 5—5 of Fig. 2.

Referring to the drawings, in Figure 1 is shown a perspective view of a formal and well known type of surface cultivator, in connection with which my special cultivator blade is adapted to be used. Although a distinct type of cultivator is shown in the present instance, my blade member is adapted for use on any of the well known types of cultivators.

Referring to the cultivator, which will be described but generally, there is found a tongue 10, the rear portion 11 of said tongue being fashioned in a manner to provide a supporting means for the axle 12, seat portion 13, as well as lever and ratchet mechanism 14, capable of adjustment as to the blade members which form the subject matter of the present application. Ground wheels 15 are suitably attached to the projecting ends of the axle. Relative to the mechanism for raising and lowering the cultivator blades, we find said mechanism made up of the formal quadrant and spring tension lever described previously as 14, said mechanism having attachment with supporting members 15ª through the spring tension portion 16. The supporting members 15ª for the cultivator blades are indirectly connected with the cultivator blades, inasmuch as the actual connection with said blades is made through levers 17 having a frictional adjustable connection 18 therewith. A further adjustment of the cultivator blades is permitted in the actual bolting of the cultivator blades to the attachment portion through the apertures or bolt holes 19, there being a plurality of said holes to permit not only the interchange of opposed blades to allow continued use without sharpening, but also a slight up and down adjustment of the forward portion of said blade.

With relation to the cultivator blade, itself, which forms the basis of the present application, we find a blade portion 20 of considerable length, at least with respect to the well known type of surface cultivator blades, wherein two blades disposed one behind the other are normally used. This extended blade portion 20 is fashioned throughout a considerable part of its length and at the forward portion thereof in a concave manner as shown perhaps clearest in Fig. 5 of the drawings. The rear end and minor portion of the blade is flattened, as shown perhaps clearest in Fig. 4 of the drawings.

The forward end 21 of the blade is pointed, or substantially so, and the cutting edge thereof trails off in a gradual curve, with the ground engaging edge 22 lapped over or turned in in such manner as to prevent any accumulation of entangling vines or any other material thereon. The opposed edges 23 and 24 of the blade are sharpened and hence are adapted for interchange with the opposed blade, as shown in Fig. 1, through the before described adjustment and attachment mechanism.

In describing the operation of the present blade, and its comparative use with other well known cultivator blades of the surface type, it might be well to state that whereas the ordinary surface cultivator utilizes four blades, two upon either side, the present specially formed blade takes the place of the before stated double blades, and is capable not only of the same useful function as relates to the action upon the soil, but also has the increased advantage of automatically cleansing itself, as well as permit interchangeability with the opposed blade, and thereafter continued use without a sharpening operation, this naturally following the fact that the blades are capable of being sharpened on both sides before the initial assembling.

In the plowing operation, the present blade, due to its concave forward fashioning, carries the plowed soil back beyond the attachment portion before said soil is permitted to overflow or pass over the upper edge thereof. It is obvious that when the accumulated plowed soil reaches the flat portion of the blade, it will overflow the blade. The present blade prevents any entanglement of vines that overrun the fields about the attachment portion for the blade as well as preventing the entanglement of said vines about the blades themselves. This entanglement of vines about the attachment members and the blade portions themselves accompanies the use of the well known types of surface cultivator blades, and causes the blade to drag through the ground to prevent the most efficient operation thereof, as well as making necessary the manual cleaning of the blades.

The present blade, due to the slight lapping of the engagement edge 22, causes a slight vacuum behind said edge and prevents the accumulation of any débris thereon. Similarly, the carrying of the plowed soil, as well as the entangling vines, beyond the engagement portion of the blade, causes an automatic cleansing of the blade and hence most efficient operation thereof.

Again, the fact that the present blades are interchangeable obviates the necessity of the sharpening to a considerable degree, thus increasing utility.

What I claim is:

1. A cultivator blade fashioned with sharpened opposed edges, the forward portion of said blade member being concave and the rear portion flattened, and adjustable attachment mechanism for said blade permitting interchange thereof.

2. A cultivator blade comprising a concave forward portion, a flattened rear portion, opposed cutting edges capable of initial sharpening, a portion of the cutting edges being inturned to prevent the accumulation of matter therebetween, and adjustable means for supporting said blade members permitting removal and interchangeability.

3. A surface cultivator comprising adjustable blade members, said blades including a concave forward portion, a flattened rear surface, opposed cutting edges and attachment mechanism permitting relative adjustment and interchangeability.

Signed at Bloomington, Illinois, this 1st day of July, 1925.

LLOYD E. TROYER.